United States Patent
McKell-Redwood et al.

(10) Patent No.: US 12,189,743 B2
(45) Date of Patent: Jan. 7, 2025

(54) SELF-SERVICE BIOMETRIC ENROLLMENT AND AUTHENTICATION METHOD, SYSTEM, AND COMPUTER PROGRAM

(71) Applicant: AMADEUS S.A.S., Biot (FR)

(72) Inventors: Colin McKell-Redwood, Bavaria (DE); Nicolas Torres, West Drayton (GB); Gregorio Gianluca Prestia, Cagnes sur Mer (FR); Mohamed-Amine Maaroufi, Antibes (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/051,129

(22) Filed: Oct. 31, 2022

(65) Prior Publication Data
US 2023/0084139 A1 Mar. 16, 2023

Related U.S. Application Data

(63) Continuation of application No. 17/040,624, filed as application No. PCT/EP2019/060273 on Apr. 23, 2019, now Pat. No. 11,487,860.

(30) Foreign Application Priority Data

Apr. 23, 2018 (EP) .................................... 18290038

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/34* (2013.01); *G06V 40/70* (2022.01); *H04L 9/3231* (2013.01);
(Continued)

(58) Field of Classification Search
CPC ......... G06F 21/32; G06F 21/34; G06V 40/70; G06V 40/1365; G06V 40/172; G06V 40/197; H04L 9/3231
See application file for complete search history.

(56) References Cited

U.S. PATENT DOCUMENTS 8,604,901 B2 * 12/2013 Hoyos .................... G06V 40/10
340/5.82
10,715,520 B2 7/2020 Bhatt et al.
(Continued)

FOREIGN PATENT DOCUMENTS

CN 101330386 A 12/2008
WO WO-2016105728 A1 6/2016
(Continued)

OTHER PUBLICATIONS

EPO, Extended European Search Report, Nov. 6, 2018 re European Patent Application No. 18290038.1.
(Continued)

*Primary Examiner* — William A Corum, Jr.
(74) *Attorney, Agent, or Firm* — Perry + Currier Inc.

(57) ABSTRACT

Authentication method and system using biometric data of a person. The method is flexibly usable on a plurality of distinct verification and authentication devices and comprises a verification process and an authentication process. First biometric data is captured by the verification device and compared to official biometric data. Captured and inputted data is certified and stored. At time of a required authentication of the person, live biometric data of the person is captured and compared to first biometric data. If the data is similar, the person is automatically authenticated.

11 Claims, 7 Drawing Sheets

(51) Int. Cl.
*G06F 21/34* (2013.01)
*G06V 40/70* (2022.01)
*H04L 9/32* (2006.01)
*G06V 40/12* (2022.01)
*G06V 40/16* (2022.01)
*G06V 40/18* (2022.01)

(52) U.S. Cl.
CPC ........ *G06V 40/1365* (2022.01); *G06V 40/172* (2022.01); *G06V 40/197* (2022.01)

(56) References Cited

U.S. PATENT DOCUMENTS

| | | | |
|---|---|---|---|
| 2007/0118758 A1* | 5/2007 | Takahashi | G06F 21/305 713/186 |
| 2008/0019578 A1 | 1/2008 | Saito et al. | |
| 2008/0122578 A1* | 5/2008 | Hoyos | G06V 40/10 340/5.52 |
| 2009/0226048 A1* | 9/2009 | Fukuda | G06V 30/242 382/118 |
| 2012/0324235 A1 | 12/2012 | Bolle et al. | |
| 2013/0215275 A1* | 8/2013 | Berini | G06V 10/993 348/150 |
| 2013/0305059 A1* | 11/2013 | Gormley | G07F 7/08 713/189 |
| 2013/0339748 A1 | 12/2013 | Stinson, III | |
| 2015/0319170 A1 | 11/2015 | Grossemy | |
| 2016/0012217 A1 | 1/2016 | Wolf et al. | |
| 2016/0125179 A1* | 5/2016 | Bouatou | G06F 21/32 340/5.82 |
| 2017/0264599 A1 | 9/2017 | O'Regan et al. | |
| 2020/0387906 A1 | 12/2020 | Vondrak et al. | |
| 2021/0294880 A1* | 9/2021 | Polychronidis | G06F 21/32 |

FOREIGN PATENT DOCUMENTS

| | | |
|---|---|---|
| WO | WO-2018038914 A1 | 3/2018 |
| WO | WO-2018089098 A1 | 5/2018 |

OTHER PUBLICATIONS

ISA/EP, International Search Report and Written Opinion, Jul. 12, 2019 re PCT International Patent Application No. PCT/EP2019/060273.

* cited by examiner

SELF-SERVICE BIOMETRIC ENROLLMENT AND AUTHENTICATION METHOD, SYSTEM, AND COMPUTER PROGRAM

CROSS-REFERENCE TO RELATED APPLICATIONS

This application is a continuation of U.S. patent application Ser. No. 17/040,624, filed Sep. 23, 2020, which in turn is a national stage of PCT Patent Application No. PCT/EP2019/060273, filed Apr. 23, 2019 and claiming priority from European Application No. 18290038.1, filed Apr. 23, 2018. The contents of the above-identified applications are incorporated herein by reference.

FIELD OF THE INVENTION

The present invention relates to biometric identification systems and more particularly to a method, system, and computer program for biometric authentication of people applying a verification process on a verification device and an authentication process on an authentication device.

BACKGROUND

Biometric identification is a technology with an arising relevance as it can be applied for automatic access control to restricted areas, for example at borders, companies, airports, or hotels. The identification is thereby mostly based on facial pictures, fingerprint images, palm vein images, iris scans, and/or voice recordings.

State of the art biometric identification systems usually require one consolidated system that is involved in collecting biometric data of a person to be identified later and in comparing the collected biometric data with the live biometric data on time of identification of the person. If biometric identification is used for granting access to a restricted area in a company, the collecting of biometric data, e.g. fingerprints or iris scans, and the comparison of the collected biometric data with live data, e.g. at the security door, may be processed by the same computational system. However, if biometric identification is used for granting access to a more or less public space, e.g. to a concert hall, to secure areas in an airport, or to platforms at a train station, the people to be identified belong to a much larger and more widespread group. In such cases, collecting the biometric data of the people beforehand appears difficult if not impossible in a single consolidated system.

Furthermore, storing biometric data in databases leads to data security issues. If the database, in which the collected biometric data is stored, cannot be totally encapsulated, e.g. if a distributed system is used for collecting biometric data and comparing the collected biometric data with live biometric data, sensitive data may be accessed by unauthorized people.

Therefore, there is a need of improved flexible systems that are capable of logically and physically separating the collection of biometric data on the one hand and the authentication and the access control on the other hand while always keeping an eye on data security issues with sensitive personal data. The presented invention concerns such an improved biometric authentication method, system and computer program.

SUMMARY OF THE INVENTION

According to a first aspect of the invention, an authentication method comprising a verification process and an authentication process is presented. The verification process and the authentication process are conducted on at least two distinct systems. At least parts of the verification process are conducted on at least one verification device and at least parts of the authentication process are conducted on at least one authentication device.

The verification process comprises capturing first biometric data of a person and extracting second biometric data from a biometric identification document. The first biometric data is compared with corresponding second biometric data from the biometric identification document to obtain a similarity value comparable with a first similarity threshold. The authentication process comprises capturing live biometric data of the person and receiving the first biometric data of the person. Then, the live biometric data is compared with the first biometric data. In response to a similarity value of the live biometric data and the first biometric data exceeding a second similarity threshold the person is authenticated.

In an embodiment, the verification process further comprises, in response to the first similarity value of the first biometric data compared with the second biometric data exceeding the first similarity threshold, verifying the person's identity. Further additional data is gathered. The first biometric data and the additional data are certified and stored. In another embodiment, at least one of the verification devices is a mobile device of the person and, in the verification process, storing the certified first biometric data and the certified additional data comprises storing the certified data on the mobile device of the person. Furthermore, in the authentication process, receiving the first biometric data of the person comprises transferring the certified first biometric data from the mobile device of the person to the authentication device.

In another embodiment, at least one of the verification devices is a self-service terminal, and the verification process, conducted on the self-service terminal, further comprises obtaining an identification number, wherein the identification number is a unique identification number extracted from the biometric identification document. In response to the similarity value of the first biometric data and the corresponding second biometric data from the biometric identification document exceeding the first similarity threshold, a key is generated using the additional data. The certified first biometric data and the certified additional data are encrypted with the key generated from the additional data and stored with the identification number in a central database. Furthermore, in the authentication process, receiving the first biometric data of the person comprises capturing an image of an authentication biometric identification document of the person and extracting authentication additional data and an authentication identification number from the biometric document. A key is generated using the authentication additional data. The stored encrypted certified first biometric data are queried from the central database using the authentication identification number and decrypted with the key generated from the authentication additional data.

In yet another embodiment, at least one of the verification devices is a mobile device of the person and, in the verification process, the certified first biometric data and the certified additional data are stored on the mobile device of the person. The verification process, in response to the person announcing the need to being authenticated in the near future, further comprises obtaining an identification number and storing the certified first biometric data and the certified additional data with the identification number in a central database.

In another embodiment, the verification process further comprises extracting data specific to the verification device from the verification device, generating a key using the data extracted from the verification device, encrypting the certified first biometric data and certified additional data with the key generated from the extracted data and storing the encrypted certified first biometric data and the certified additional data in a central database. In response to the person announcing their need to being authenticated in the near future, the verification process further comprises requesting consent to use the stored data comprising the encrypted certified first biometric data and certified additional data. And in response to the consent of the person to use the stored data being noted, the verification process further comprises decrypting the encrypted certified first biometric data and certified additional data with the key generated from the data extracted from the verification device.

In yet another embodiment, the authentication process further comprises making a plurality of certified first biometric data items of people to authenticate available from a central database to an authentication device, wherein receiving the certified first biometric data of the person comprises comparing the plurality of certified first biometric data items with the captured live biometric data of the person and selecting, in response to one of the plurality of certified first biometric data being similar to the live biometric data, the similar certified first biometric data as first biometric data of the person.

In another embodiment, the central database is secured by a hardware security module and/or the data stored in the central database is encrypted. In yet another embodiment, the first biometric data, the second biometric data from the biometric identification document and the live biometric data comprise biometric facial images, iris scans, fingerprint images, or a combination thereof. In yet another embodiment, the additional data comprises data extracted from the biometric document, manually entered data, data retrieved from a third party, or a combination thereof.

In another embodiment, the first biometric data, the second biometric data from the biometric identification document and the live biometric data comprise vectorized representations of biometric facial images, iris scans, fingerprint images, or a combination thereof, and wherein the algorithm used for vectorizing the data is predefined by an operator of the authentication device. In yet another embodiment, the first biometric data and/or capturing the live biometric data comprise taking a photo of at least a part of the person and/or extracting second biometric data from the biometric identification document comprises capturing the image of a biometric identification document, which comprises taking a photo of the biometric identification document, scanning the biometric identification document or visually inspecting the biometric identification document.

In another embodiment, when a requirement of authentication ends, any received data is deleted. In yet another embodiment, authenticating the person comprises at least one of granting access to an area, transferring the certified additional data to the authentication device, decrypting the certified additional data, or a combination thereof. In yet another embodiment, the verification process further comprises generating a user account associated with a unique user ID for the person, wherein the user account is secured by a user name and a PIN.

According to a second aspect of the invention, an automatic authentication system for authenticating a person that comprises at least one verification device and at least one authentication device is presented. The at least one verification device is remote from the at least one authentication device and the at least one verification device and the at least one authentication device are configured to communicate via a network.

The at least one verification device is configured to capture first biometric data of a person, extract second biometric data from the biometric identification document, and compare the first biometric data with corresponding second biometric data from the biometric identification document to obtain a similarity value comparable with a first similarity threshold. The at least one authentication device is configured to capture live biometric data of the person; receive the first biometric data of the person, compare the live biometric data with the first biometric data, and, in response to a similarity value of the live biometric data and the first biometric data exceeding a second similarity threshold, authenticate the person. In another embodiment, the automatic authentication system further comprises a database system, wherein the database system is remote from the at least one verification device and the at least one authentication device. The database system configured to communicate with the verification device and the authentication device via the network. Furthermore, the database system is configured to receive data from the at least one verification device and make data available to the at least one authentication device.

In another embodiment, the automatic authentication system is configured to fulfill all features of the method presented above.

According to a third aspect of the invention, a computer program product, which is either in the form of a machine-readable medium with program code stored on it, or in the form of a propagated signal comprising a representation of program code, is provided, wherein the program code, executed on a computer system, is arranged to carry out the features of the here presented method.

BRIEF DESCRIPTION OF THE DRAWINGS

The subsequent description of embodiments is based on the accompanying set of figures, in which similar reference numerals refer to similar elements and messages and in which.

DETAILED DESCRIPTION

Figure 1:
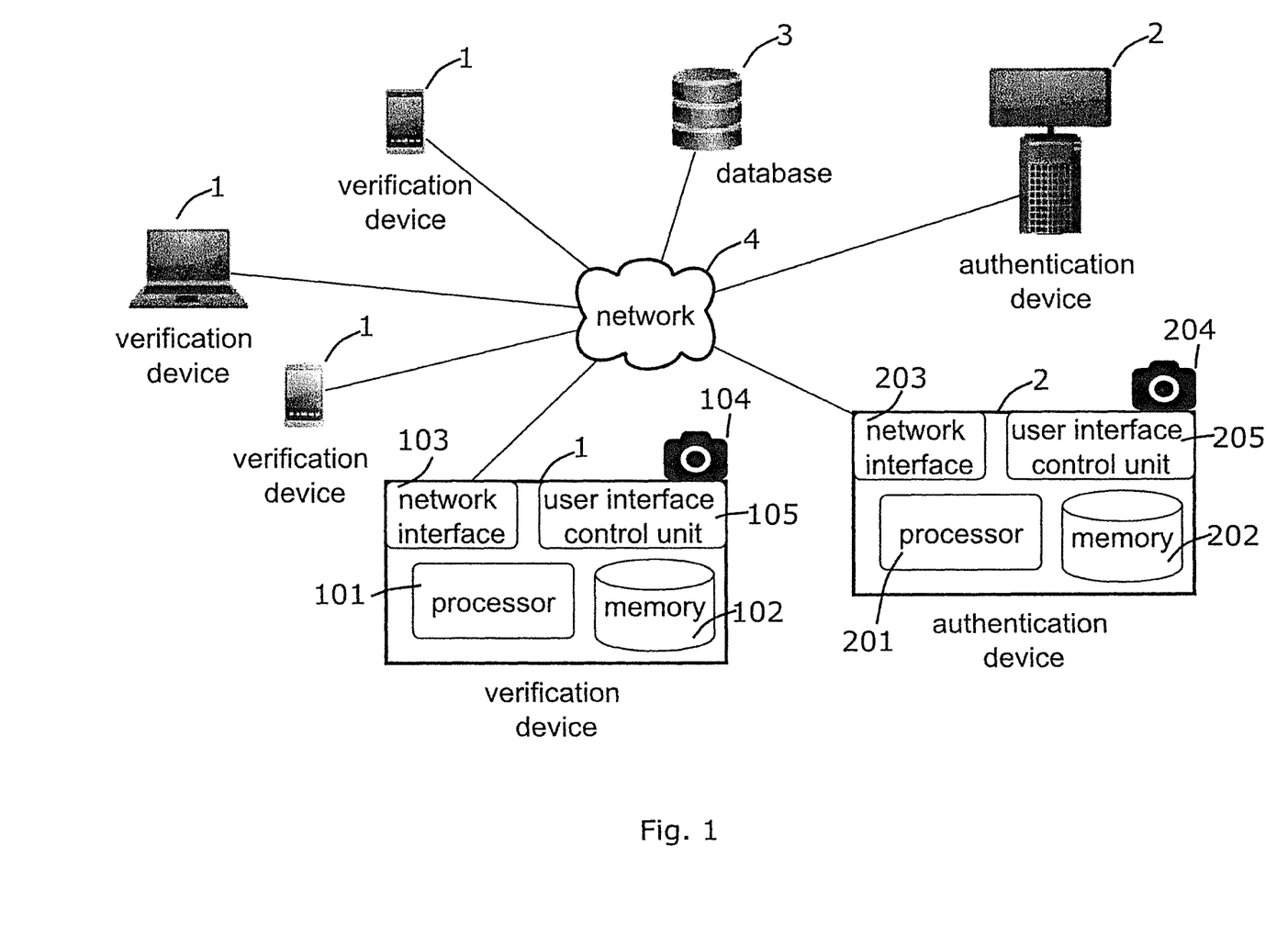
FIG. 1 depicts an example of a possible operating environment.

FIG. 1 illustrates an exemplary operating environment. In accordance with an embodiment, the environment may include one or more verification devices 1, one or more authentication devices 2, and one database system 3. The verification devices 1, the authentication devices 2, and the database system 3 may communicate through one or more private or public networks 4, e.g. the Internet or local area network. The database system 3 comprises at least one database. Furthermore, the database system 3 may be secured by a hardware security module and/or contain data that is encrypted in different ways.

Each verification device 1, which may be a desktop computer, a laptop computer, a tablet computer, a mobile phone, a self-service terminal, a smart camera system, or any other suitable device, may include a processor 101, a memory 102, a network interface 103 and a camera 104. Furthermore, it may include a user interface control unit that controls 105 the use of a camera 104 and the communication with the user through a display, which may or may not be a touchscreen, and/or through an alpha-numeric and cursor input device.

Each authentication device 2, which may be an access control system, a desktop computer, a laptop computer, a tablet computer, a mobile phone, or any other suitable device, may also include a processor 201, a memory 202, a network interface 203 and a camera 204. Furthermore, it may also include a user interface control unit 205 that controls the use of a camera 204 and the communication with the user through a display, which may or may not be a touchscreen, and/or through an alpha-numeric and cursor input device.

The verification devices 1 and the authentication devices 2 are arranged to host computer programs with sets of instructions to perform at least parts of the method as described herein. An executable set of instructions (i.e. software) embodying any one, or all, of the features described herein, resides completely, or at least partially, permanently in the memory of the verification devices 1 and/or authentication devices 2. When executed, corresponding process data resides in the memory and/or the processor of the verification devices 1 and/or authentication devices 2. In some embodiments, the central database system 3 may fully or partially host the computer programs that are arranged to fulfil the features of the method as described herein. The verification devices 1 and/or authentication devices 2 may additionally host computer programs that are arranged to fulfil the remaining method features.

The computer programs and the fulfilled method steps on each verification device 1 may differ depending on what type the verification device 1 is. All the same, the computer programs and the fulfilled method steps may differ on each authentication device 2. For example, the computer program fulfilling parts of the method steps according to this invention that is running on a mobile phone as verification device 1, i.e. an "App", may be arranged to fulfil partially different method steps from a computer program according to this invention running on a self-service terminal, e.g. on a self-service check-in terminal at an airport. It should be noted that it is desired to provide the possibility to use different verification devices 1 and/or authentication devices 2 within in the same overall biometric authentication system and using methods according to this invention.

Figure 2:
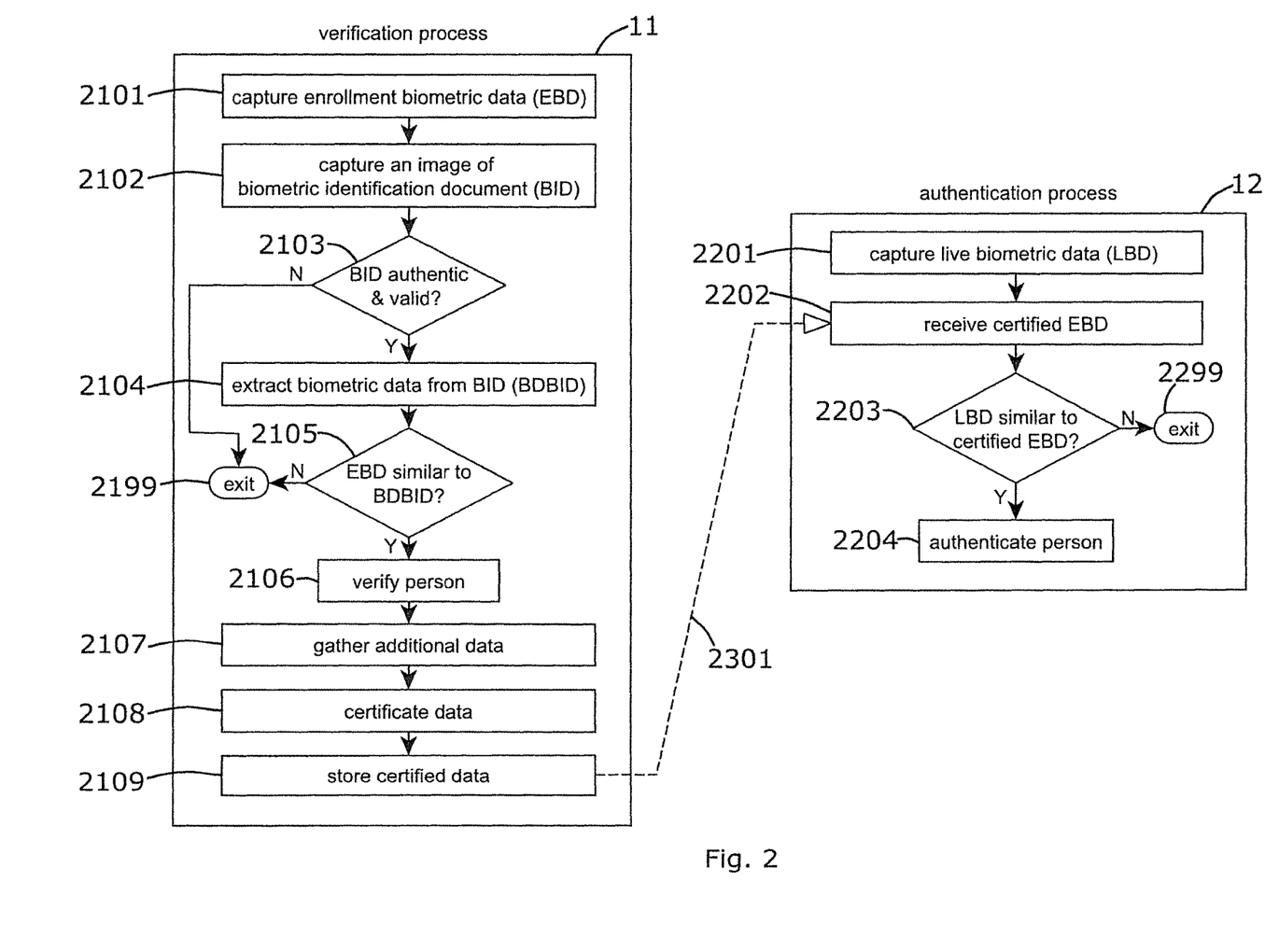
FIG. 2 shows a flowchart of a verification process and an authentication process according to the claimed method with its main procedural steps.

Before now turning to the detailed description of specific embodiments in FIGS. 3 to 6, some general explanations about the principle of operation of the claimed method shall be given with the aid of FIG. 2. The claimed method according to the invention requires at least one verification device 1 and at least one authentication device 2. At least parts of a verification process 11 are conducted on the at least one verification device 1 and at least parts of an authentication process 12 are conducted on the at least one authentication device 2, wherein the verification process takes place some time before the authentication process.

A person that wants to or has to be biometrically identified and authenticated in the near future, e.g. because the person wants to travel abroad or needs access to a restricted area at a public building, can use one of a plurality of supported verification devices 1, e.g. his/her mobile phone or other mobile device, a self-service terminal at a public building, or a device of another person, to start the verification process 11.

At the beginning of the verification process 11 in step 2101, live biometric data is captured by the verification device 1 as first enrollment biometric data. For example, the person takes a selfie, i.e. she/he takes a photograph of her/his face with the onboard camera of her/his mobile phone, or the person puts her/his fingertip on a fingertip sensor. The person further uses a biometric identification document. In step 2102, an image of the biometric identification is captured, e.g. the person also takes a photograph with her/his mobile phone of a part of her/his biometric identification document in which the biometric data is present. In step 2103, it is then determined whether the biometric identification document is authentic and valid. This may be done by querying a government database for a unique ID number of the biometric identification document, by verifying security features, e.g. holograms, of the biometric identification document, by checking expiry dates, by a combination of these techniques or by any other suitable methods. If the biometric identification document is not authentic and/or valid, the verification process terminates in step 2199.

If the biometric identification document is authentic and valid, the verification process 11 goes forward to step 2103 in which biometric data is extracted from the biometric identification document. For example, a biometric facial picture included in the biometric identification document is extracted. Of course, the enrollment biometric data and the biometric data extracted from the biometric identification document are generally understood to be of the same type, e.g. both are facial pictures, both are fingerprint images, both are a combination of iris scans and fingerprint images or the like. On the other hand, the skilled person could imagine a database connecting a single person's fingerprint with a facial image, in which case such a database would be accessed as part of the verification process. The extraction of the biometric data from the biometric identification document may be done with an image analysis algorithm based on machine learning with Hidden Markov Models and/or Support Vector Machines, on Fast Fourier Transformation (FFT) or other suitable algorithms.

In step 2105, the extracted biometric data from the biometric identification document is compared with the enrollment biometric data. Therefore, a similarity value, e.g. 0 for no similarity and 1 for substantially identical data, is calculated and compared with a similarity threshold, e.g. 0.9. There are different ways to calculate such a similarity value as the person skilled in the art will know. For example, if two facial biometric images, one captured as enrollment biometric data and one extracted from the biometric identification document, are compared, each of the images may be normalized and landmarks, such as specific points relating to the eyes, nose, mouth etc., of a human face may be determined. A feature vector may then be generated by calculating distances between these landmarks and writing them into the feature vector. Thus, two images of a face from the same person should have feature vectors with nearly equal values on each position. Therefore, a possible similarity value may be $$\frac{1}{1+d},$$

wherein d is the distance, e.g. Euclidean distance, between the vectors.

If the enrollment biometric data and the extracted biometric data are not similar enough, e.g. their similarity value does not exceed the pre-defined similarity threshold, the verification process 11 terminates in step 2199. If the enrollment biometric data and the corresponding biometric data from the biometric identification document, i.e. their similarity value, exceed a similarity threshold, the person is verified in step 2106. Verification of the person, i.e. confirmation that the person who is in front of the verification device is equal to the person the biometric identification document is belonging to, may have further effects depending on where and under which circumstances the method is applied. For example, if the verification device is a self-service terminal at an entry of a building, verifying the person may lead to an opening of a door; or if the verification device is a mobile phone of a person who wants to travel abroad, verifying the person may enable the person to check-in to a flight via a mobile application.

After verifying the person, additional data is usefully gathered in step 2107, e.g. name, birth date, gender, frequent flyer number, or driver license number. In step 2108, the enrollment biometric data and the additional data are certified. Certification may be achieved in different ways and separately for each type of data. For example, the enrollment biometric data may be automatically certified if it is similar to the biometric data extracted from the biometric identification document and no manipulation on the data is noticed, additional data like name and birth date may be certified after comparing them with data on the biometric document, and additional data like frequent flyer number may be certified after the person shows her/his driver license during a trip to a relevant authority. Certification may be achieved within a central public key infrastructure, which may be further used for secured data transfer between the entities, e.g. between verification device 1 and authentication device 2. Certified data entails the advantage that the person has no need to show any document to a person during the authentication phase as the data has been approved before. In the last step 2109 of the verification process 11, the certified data, i.e. the certified enrollment biometric data and the certified additional data, are stored. Where and how the data are stored depends strongly on the specific embodiment used.

The verification process 11 is completed before the authentication process 12 starts. The authentication process 12 is triggered by the requirement of the person to be authenticated, e.g. because a concert takes place, a trip starts, or the person wants to physically enter a country. In step 2201, the authentication device 2 will capture live biometric data, i.e. an image of at least parts of the person, e.g. of the face, of fingerprints, iris scans and such. To be able to compare the live biometric data with the certified enrollment biometric data of the person, the authentication device receives the stored certified enrollment biometric data in step 2202.

The dashed line 2301 represents the data transfer. There are many possible ways of transferring the data depending on the embodiment of the method. For example, the certified enrollment biometric data of the person may be transferred directly from the verification device, along with many other certified enrollment biometric data of other people from a database, or explicitly queried from a database by using a known identification number. To enrich the data security, the transferred as well as the stored enrollment biometric data may also be encrypted and/or in the form of a vectorized representation of the originally captured images as used for calculating the similarity value. It is desirable that the algorithm used to encrypt and/or vectorize the biometric data images is predefined by an operator of the authentication device so that the data captured and received on the authentication device can be compared without requiring to transfer the original captured biometric data.

After the authentication device 2 has received the certified enrollment biometric data, the enrollment biometric data is compared to the live biometric data in step 2203. If the live biometric data and the enrollment biometric data are not similar enough, the authentication process 12 terminates in step 2299. Otherwise, the person is authenticated in step 2204. Authentication, i.e. confirming the identity of the person, may comprise further actions. For example, a gate may open that grants access to a concert hall or to the security zone in an airport. Or as another example, the stored certified additional data may also be transferred to the authentication device. It is further possible to delete any stored data after the requirement of authentication ends to satisfy legal requirements around data security of sensitive biometric data.

As different embodiments of the claimed method slightly change the operating principle, FIG. 3 to FIG. 6 show embodiments for different verification devices and different applications. Starting with FIG. 3, it shows an embodiment in which the verification device 1 is a mobile phone of the person, in which no external database is required and in which the verification and authentication is used for granting access to a concert hall. Furthermore, the biometric data used for verification and authentication are biometric facial images. Other biometric data would be possible, too. The person, who in this case wants to go to a concert in the future, downloads an application on her/his mobile phone. Then, she/he can start the verification process 11.

Figure 3:
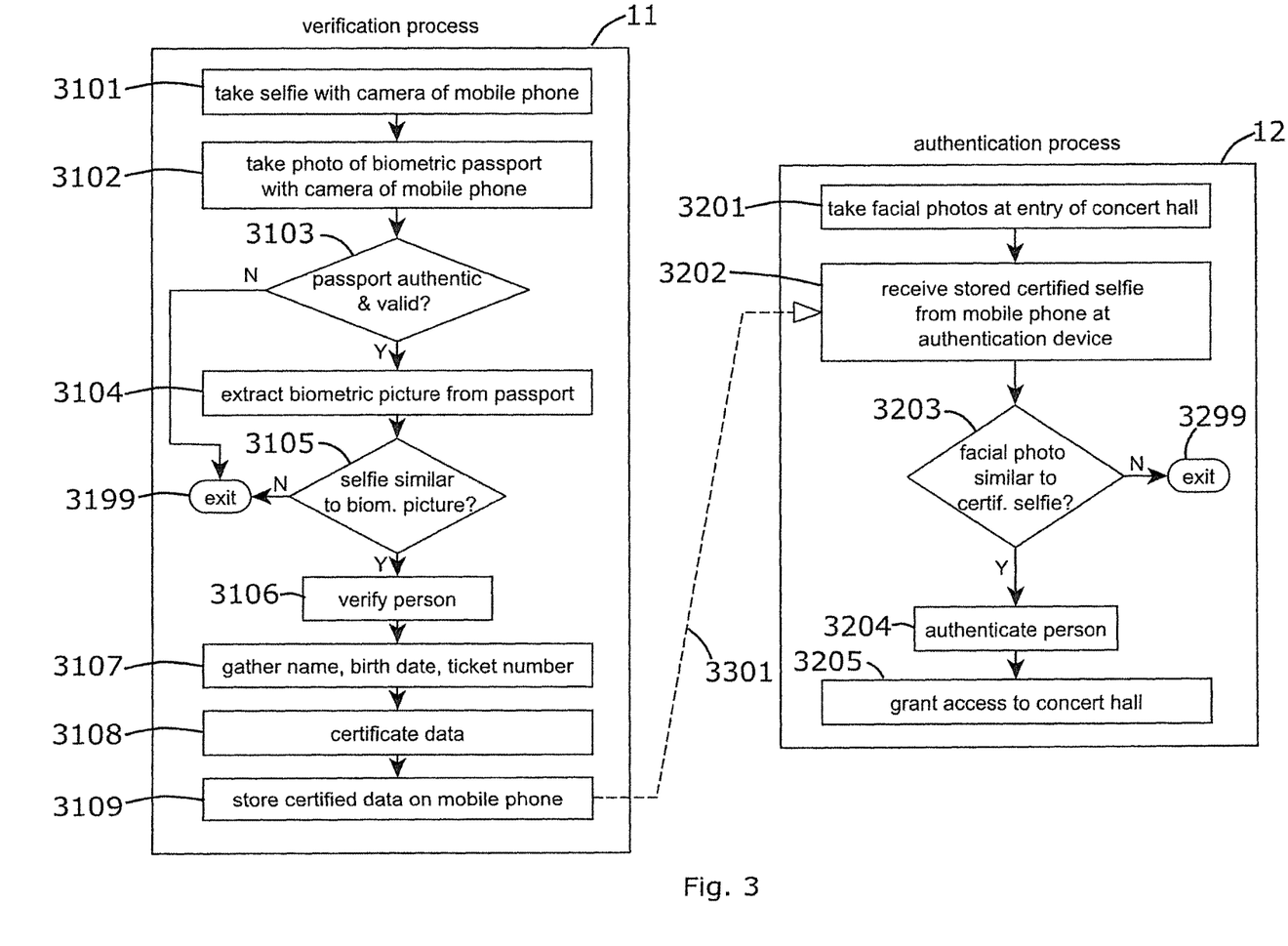
FIG. 3 shows a flowchart according to an embodiment of the invention, wherein a verification device is a mobile phone of the person, wherein no external database is required and wherein verification and authentication is used for granting access to a concert hall.

In the first step 3101, the person takes a selfie of her/his face with the mobile phone. In step 3102, she/he takes also a photo of her/his passport or at least parts of the passport. In step 3103, it is checked whether the passport is authentic and valid. If not, the verification process 11 terminates in step 3199. If the passport is authentic and valid, the verification process 11 goes to step 3104 and extracts the biometric facial picture from the passport. The extracted biometric picture is then compared with the selfie in step 3105. Here again, if they are not similar enough, the verification process 11 terminates in step 3199. Otherwise, the person is verified in step 3106. For a concert, several data items may be needed. The verification process 11 may thus gather additional data like name, birth date, ticket number or the like. This is done in step 3107. The data is then certified in step 3108 and stored only locally on the mobile phone in step 3109. Therewith ends the verification process 11.

On the day of the concert and for example at the entry of the concert hall, the authentication process 12 starts. The authentication process 12 may also be done once, twice or even more times. For example, the authentication process 12 may be started once at the entry of the concert hall, once at the security checks inside the concert hall and once at the entry of backstage zones for special guests, musicians and actors. However, FIG. 3 focuses on the authentication process 12 at the entry of the concert hall. In step 3201, a camera 204 takes facial pictures of people before entering the concert hall. In the same moment or shortly before or after this, the stored certified selfie is transferred from the mobile phone to the authentication device 2, which is shown in step 3202. The data transfer 3301 may be triggered by an automatic connection of the application on the mobile phone via a network, e.g. Bluetooth or Wi-Fi, with the authentication device.

Thereafter, the facial photo taken at the entry and the certified selfie are compared in step 3203. If they are not similar enough, the authentication process 12 terminates in step 3299. If they are similar enough, the person is authenticated in step 3204. The authentication step 3204 may trigger further actions. The gathered and certified additional data may then be transferred from the mobile phone to the authentication device 2. This may, for example, enable the authentication device 2 to compare the certified name of the person with the names of special ticket holders or to compare the certified ticket number with a list of all ticket number for this concert. Even other steps may be done before access to the concert hall is finally granted in step 3205.

Figure 4:
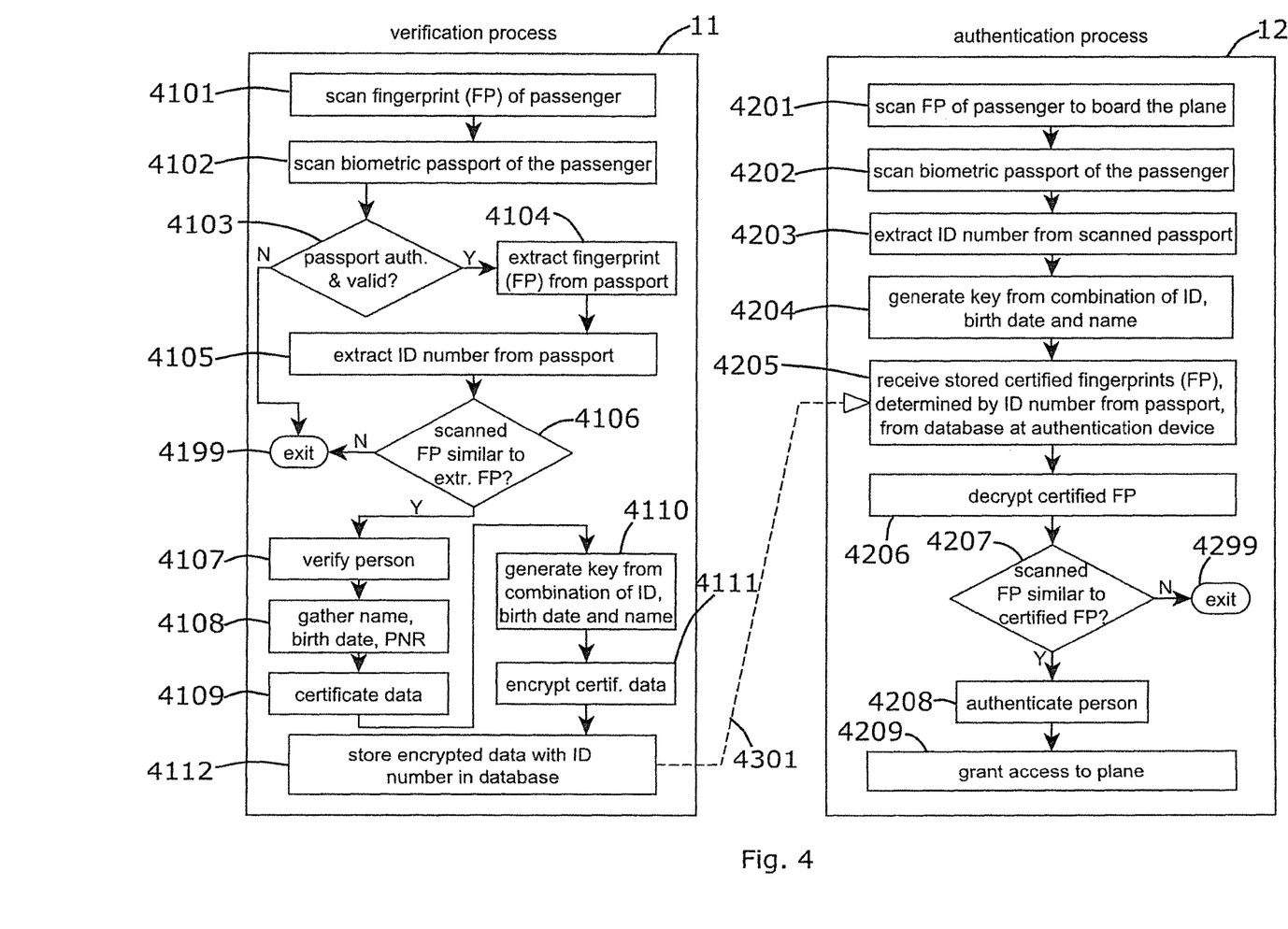
FIG. 4 shows a flowchart according to an embodiment of the invention, wherein a verification device is a self-service check-in terminal at an airport, wherein no mobile device is required as verification device and wherein the used biometric data are fingerprints.

Now coming to the flowchart of FIG. 4 depicting an embodiment in which the verification device 1 is a self-service check-in terminal at an airport and the used biometric data are fingerprints. The person, in this case a passenger, arrives at the airport and has no need to carry a mobile device with her/him. At the self-service check-in terminal, one or more fingerprints of the passenger are scanned in step 4101. In step 4102, the biometric passport is scanned, too. Here, it is assumed that the biometric passport comprises an image of one or more fingerprints of the person. In step 4103, it is checked whether the passport is authentic and valid. If not, the verification process 11 terminates in step 4199. If the passport is authentic and valid, the verification process 11 goes to step 4104 and extracts the fingerprint data from the passport. Furthermore, the verification process 11 extracts a unique passport ID in step 4105. Then, the fingerprints, i.e. the scanned fingerprints by the self-service check-in terminal and the fingerprints extracted from the passport, are compared in step 4106. If they are not similar enough, the verification process 11 terminates in step 4199. Otherwise, the passenger is verified in step 4107. In step 4108, further data required for the travel is gathered, e.g. name, birth date, booking number to access the passenger name record (PNR) and the like. This data may for example be extracted from printed ticket or entered manually by the passenger. In step 4109, this data is at least partially certified.

To ensure that the gathered data of the passenger, which is sensitive private data, is not misused and protected from unauthorized access, the data is encrypted before it is stored in a central database. Therefore, a key is generated in step 4110 by using the unique ID of the biometric passport, the birth date and the name. Of course, other data that is extracted from the biometric passport may be used as well or instead. A way to generate such a key is for example to append the name to the birth date and to the ID and to hash the resulting string. Let the name be "John Smith", the birth date (in Format YYYYMMDD) be "19701020" and the ID be "123456789ABC", then, the resulting string would be "JohnSmith19701020123456789ABC". Now applying a predetermined hashing algorithm, for example, the MD5 hashing algorithm, the hash will be "f6e398145b4ba7df43af39157d20ab52". This hash will then be used as key to encrypt the data in step 4111. The original string may also be used as key without hashing it or other hashing algorithms like SHA-3 (Keccak) or BLAKE are applicable as well. After having encrypted the data, the encrypted data is stored in a central database in the last step 4112 of the verification process 11.

The passenger then walks through the airport. At different locations, such as at the security control, at the boarding zone, at an entry of a first-class lounge or at other areas where authentication is required, the authentication process 12 may take place. The flowchart of FIG. 4 focuses on the boarding zone where the access to the plane is granted. In the first step 4201, the fingerprints of the passenger who wants to enter the plane are scanned. In step 4202, the passport of the passenger is scanned, too. The unique ID number is extracted in step 4203 and used along with the additional data like birth date and name to generate a key in step 4204. The same algorithm is applied as used in the verification process. In step 4205, the encrypted certified fingerprint scan is received from the database. The data transfer 4301 may be triggered by querying the central database for the unique ID number. Then, the certified fingerprint scan is decrypted using the generated key in step 4206.

Now, the authentication process 12 compares the currently scanned fingerprints of the passenger who wants to enter the plane and the stored certified fingerprints from the verification process 11 in step 4207. If they are not similar enough, the authentication process 12 terminates in step 4299. If they are similar enough, i.e. their similarity value exceeds a similarity threshold, the person is authenticated in step 4208. Before the access to the plane is granted in step 4209, other steps may be additionally conducted. For example, the name of the passenger may be compared to the passenger list or the data from the PNR may be compared to the data on the passport. After the complete travel ends, all data that is stored in external databases may be deleted to overcome data security issues.

Figure 5:
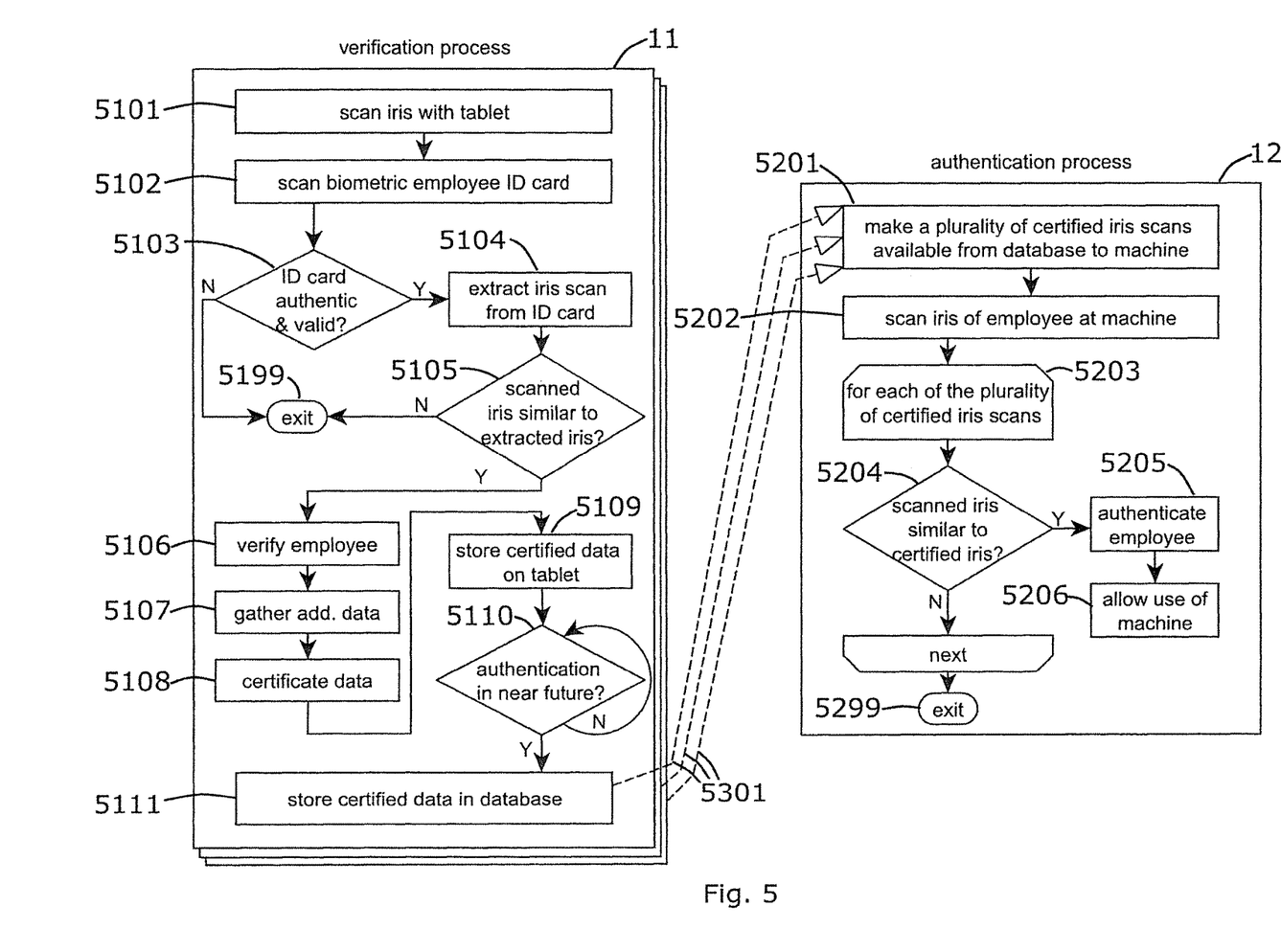
FIG. 5 shows a flowchart according to an embodiment of the invention, wherein a verification device is a tablet computer, wherein the person to authenticate an employee who requires using a machine in a factory building and wherein the biometric identification document is an employee ID card with iris scan data on it.

FIG. 5 shows a flowchart of an embodiment, in which the verification device is a tablet computer and the person to authenticate an employee who requires using a machine in a factory building. In this embodiment, the biometric identification document is an employee ID card with iris scan data on it. The employee who knows that she/he will need access to a machine in the future scans at least one of her/his irises in the first step 5101. She/he also scans her/his employee ID card in step 5102. In step 5103, it is checked whether the ID card is authentic and valid. If not, the verification process 11 terminates in step 5199. If the ID card is authentic and valid, the verification process 11 goes to step 5104 and extracts stored iris scans from the employee ID card. Afterwards, the iris scans are compared in step 5105. If they are not similar enough, the verification process 11 terminates in step 5199. Otherwise, the employee is verified in step 5106. The method gathers additional data in step 5107. This additional data may be for example the age of the employee or a time window on a day in which he may use the machine. In step 5108, at least parts of the data are certified. This certified data is stored locally on the tablet computer in step 5109.

If the employee plans to use the machine in the factory building, thus, the authentication is required in the near future, shown in step 5110, and the previous locally stored certified data is transferred to a central database and stored in it in step 5111. By providing this two-stage storage method, wherein the data in the verification process 11 is stored locally at the beginning and transferred to a central database later, the data security of the sensitive biometric data is mostly under the control of the employee. As long as the data is only stored locally, the data can only be accessed by her/him. Only if the certified data from the verification process 11 is needed in the near future is the data transferred to a central database. It is desirable that the data in the database is encrypted and/or secured by a hardware security module, i.e. a cryptographic hardware device that safeguards and manages digital keys for strong authentication and provides further cryptographic functions, to avoid misuse and to protect it from unauthorized access.

If the employee then needs to use the machine, the authentication process 12 takes place. Thus, in this example, the authentication device 2 is strongly associated with or even included in the machine. In the first step 5201, a plurality of iris scans is made available to the machine. There may be a plurality of employees who have the right to use the machine and who have transferred their data to the central database. Thus, all this data is made available to the machine, which is shown by the plurality of dashed lines 5301. Making available is to be understood broadly. For example, the data may be transferred to the machine and stored in a cache of the memory of the machine, or the database, in which the data is stored, may be accessible through a network by the machine. The machine scans the iris of the employee to be authenticated to use it in step 5202. The machine in this embodiment compares one (iris scans of the employee) to many (iris scans of all employees with allowance to use it), which is shown in the for-loop in step 5203. If one match is found, the loop breaks and authenticates the employee in step 5205. The employee is then allowed to use the machine, which is shown in step 5206. If no match is found, the authentication process 12 terminates in step 5299.

Figure 6:
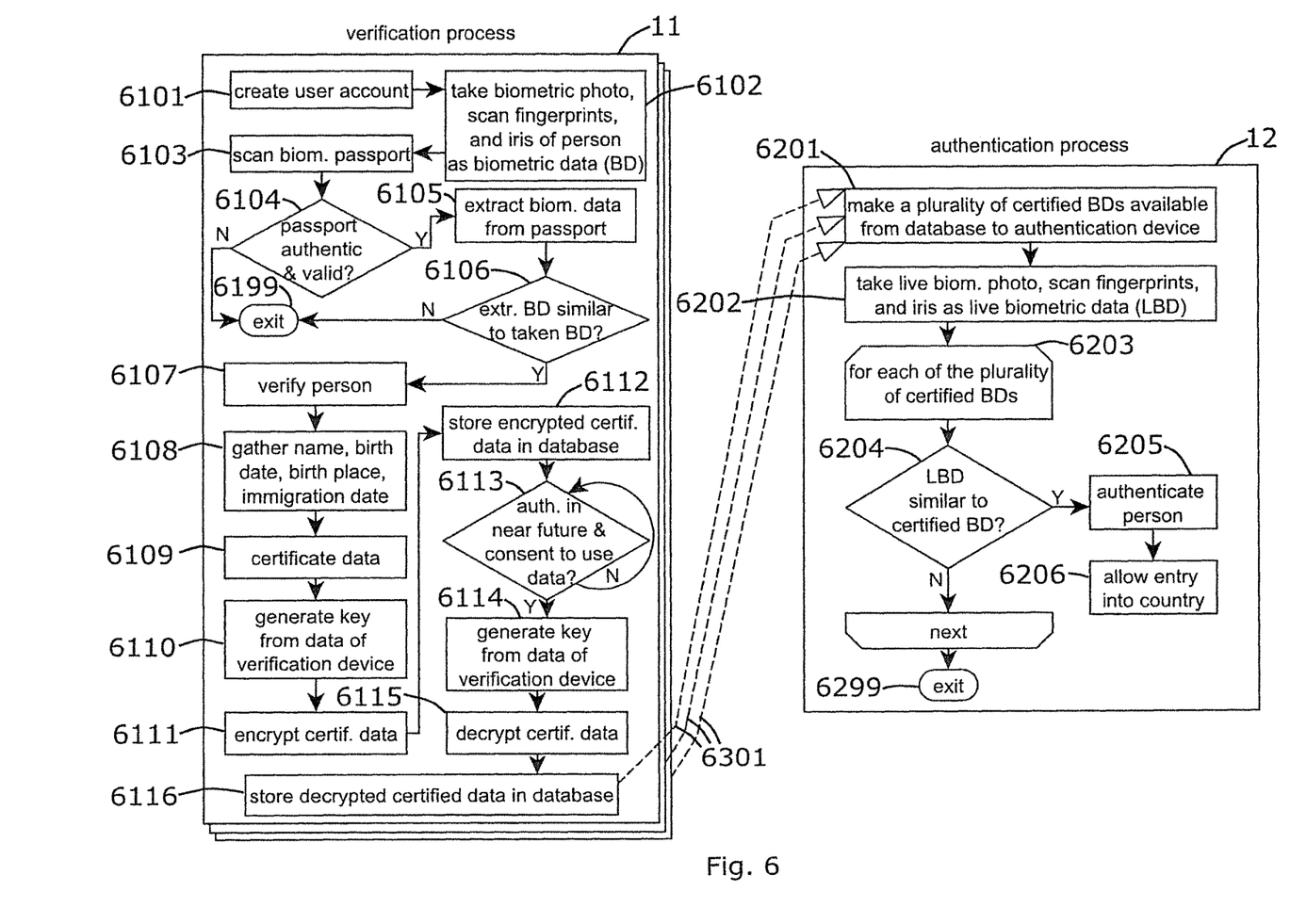
FIG. 6 shows a flowchart according to an embodiment of the invention, wherein a verification device in any device connected to an application on a website, wherein the method is used in a situation in which a person wants to immigrate to a country and wherein a combination of biometric identification features is used.

The embodiment, shown in the flowchart of FIG. 6, concerns the use of the method in a situation in which a person wants to immigrate to a country and a plurality of biometric identification features are used. In such a case, it is likely that a government would provide an application on its website hosted on a server. In step 6101, the person who wants to immigrate will need to create a user account that is usually associated with a unique user ID. In step 6102, the person takes a photo of her/his face, scans her/his fingerprints and scans her/his iris with her/his personal computer or any suitable accessory connectable with it. The person also scans her/his passport, as shown in step 6103. In step 6104, the method checks whether the passport is authentic and valid. If not, the verification process 11 terminates in step 6199. If the passport is authentic and valid, the verification process 11 goes to step 6105 and extracts stored biometric data from the passport. It is assumed that the biometric data on the passport comprises a facial picture, an image of the fingerprints and an image of the iris of the person. Afterwards, in step 6106, the biometric data from the passport are compared with the biometric data made by the person with the help of the personal computer. If they are not similar enough, the verification process 11 terminates in step 6199. Otherwise, the person is verified in step 6107.

After verifying the person, additional data, in this case, name, birth date, birth place and a date of immigration, are gathered in step 6108. This may be done automatically by extracting data from the passport and/or manually by requesting the information from the person. This data is certified in step 6109, e.g. by comparing the manually entered data with a government database. As biometric and personal data is sensitive data, it should be ensured that this data is not accessible and readable by unauthorized people. Due to the fact that this verification process can be conducted from any private device, e.g. personal computer or mobile device, connected to the Internet, it must be somehow secured that the data send from this device is assigned to the correct person. Thus, a two-factor authentication based on the used device is applied. The first-factor is the creation of the user account with the username and personal identification number (PIN). The second-factor is that the user account will be connected to the device the verification process is conducted with. That is, a key is generated from specific data of the verification device 1, e.g. the IP and mac address, which is shown in step 6110. In step 6111, the sensitive personal data is encrypted with this key and stored in step 6112 in a central database. Thus, the data cannot be accessed by anyone without using the verification device 1.

Step 6113 is conducted later, shortly prior the time the person wants to immigrate to the country. The person then has to actively confirm her/his consent to use the stored data. If the consent to use the stored data is given, the method again extracts specific data from the verification device 1. Thus, it is clear that the same verification device 1 must be used as used before. A key is generated from this specific data of the verification device 1 in step 6114. In step 6115, the stored encrypted certified data is decrypted to be used in the authentication process 12. And in step 6116, the certified data is then stored in a database.

At the date of immigration, a plurality of certified biometric datasets is made available from the database to the authentication devices 2. This is shown in step 6201. The authentication devices 2 used for such an embodiment at a border control may usually be located at an airport, at a harbor or another border installation. In step 6202, the authentication device 2 takes live biometric photos, scans fingerprints and irises of people who want to immigrate. For each of the plurality of certified biometric datasets, the live biometric data is compared with it, which is shown in step 6204. If no similar set is found, the method terminates in step 6299. Otherwise, if a similar set is found, the person is authenticated in step 6205 and allowed to immigrate to the country in step 6206.

Figure 7:
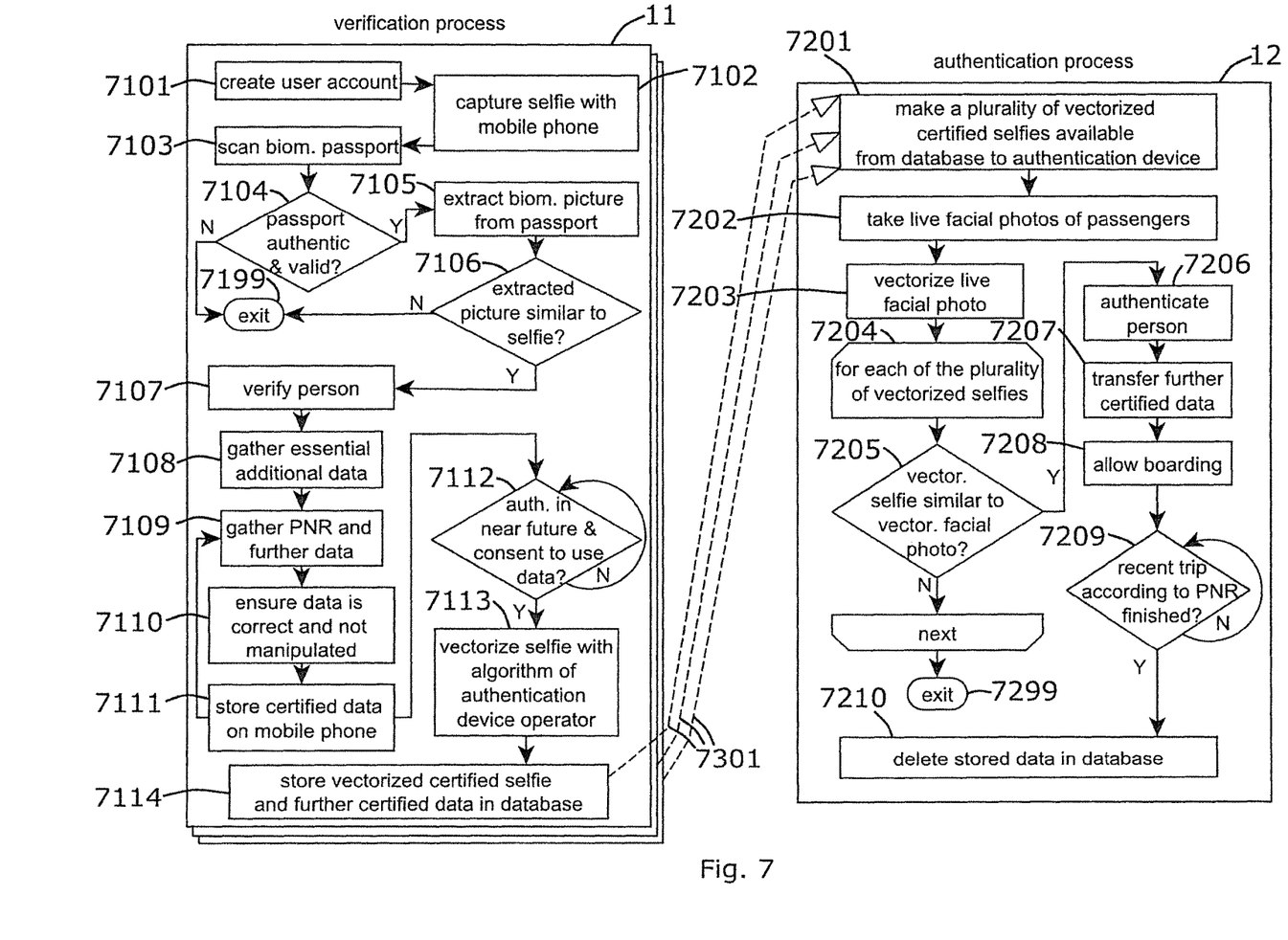
FIG. 7 shows a flowchart according to an embodiment of the invention, wherein a verification device is any device with a camera and communication means, here a mobile telephone, and wherein the method is used in a situation in which a person wishes to board an aircraft.

In another embodiment, special attention is paid to the fact that the stored sensitive data, such as biometric images, are stored only to a limited extent and for a limited time. Parts of the verification process 11 of the method are applied at mobile devices, here especially mobile phones, of passengers. Some data is transferred to a central database system 3 and the data is stored only for the time the authentication process 12 takes place, i.e. just shortly before and at the time of the authentication for travel, in this case. The authentication devices 2 in this embodiment are boarding authentication stations prior to boarding a plane to which only the data for the passengers, who are allowed to board the plane, are transferred.

In the flowchart of FIG. 7, the methods steps for this embodiment are depicted. At first step 7101, a user account for the passenger is created on the phone by using a specific application ("app"). The user account will usually be connected to a unique user ID and with an entry created in a central database. The user account may be secured by a username and a password. The central database may store a list of unique user IDs and corresponding mobile phone addresses. The steps 7102 to 7108 are usually fulfilled once directly after the user account is created. However, the person skilled in the art will know that some of these steps may be done more often, e.g. if the passenger receives a new biometric document and a new selfie must be captured.

In step 7102, the passenger takes a selfie (i.e. a facial photograph of themselves) with the inboard camera of her/his phone. The person also takes a photo of her/his passport with the inboard camera, which is shown in step 7103. In step 7104, the method checks whether the passport is authentic and valid. If not, the verification process 11 terminates in step 7199. If the passport is authentic and valid, the verification process 11 goes to step 7105 and extracts a stored biometric facial photograph from the passport photo. Afterwards, the extracted biometric picture is then compared with the selfie in step 7106. If they are not similar enough, the verification process 11 terminates in step 7199. Otherwise, the person is verified in step 7107. Once the photos are compared and determined to match, the person's data is extracted from the passport photo to populate the application in the mobile phone. The personal mobile phone thus stores the selfie and the person's personal data locally.

Meanwhile, the central database preferably stores only a list of unique user IDs and corresponding mobile phone addresses, but no personal details or photos of the people themselves.

For the purpose of biometric authentication for traveling, several data items may be required. In step 7108, the verification process 11 gathers essential additional data like name, birth date, sex, nationality or the like and stores this locally on the mobile phone. This data may be extracted from the biometric passport to ensure that no false data is received. However, at an eventual authentication step, only a subset of this information will be requested and the following method ensures that only the subset of the information requested is passed on to the body requesting authentication. Different bodies will require different information. For instance, a first airport might just need passport number whereas a second airport or a specific airline might require frequent flyer numbers.

The verification process continues as follows.

Further additional data, in this embodiment the passenger name record (PNR), is gathered in step 7109. The passenger may enter her/his PNR number via the app in the mobile phone and the details of the PNR may be queried by the app from a database of a travel expert, of an operating airline or the like. The passenger may be prompted to add PNR details to their application at the time of booking. The central database may also receive the PNR reference number at least and thus now stores the unique user ID, the mobile phone address and the PNR reference for each person with an account and an imminent trip booked.

For all the gathered data, it is verified that the data is correct and not manipulated. For example, if the selfie and the biometric passport have been taken by the same camera, i.e. with the same mobile phone, the selfie is certified. For the data extracted from the biometric passport, the certification may be done by ensuring that the data has not been manipulated later, e.g. with the use of a hash as the skilled person will know. For the PNR, a certificate may be also transferred from the database to ensure the correctness and/or parts the data of the PNR may be compared to the data already certified in the mobile phone. This certification of the data is shown in step 7110. After at least required parts of the data have been certified, the certified data are stored only locally on the mobile phone in step 7111. The app may call the global distribution system that allocates PNR references to determine details of the trip associated with the PNR and these details (origin, destination, etc.) may be stored in the central database.

Thus, until now, all personal data is only stored locally. Specifically, the phone app may by now be storing minimal PNR details, the passenger's photo, passport details and perhaps the passenger name.

The next step occurs shortly before travel, for example two days before the date of travel. The details of all passengers with accounts in the central database are scanned in order to extract the user IDs of passengers who will be travelling in the next two days (or who will be travelling two days later—this parameter is modifiable as the skilled person will understand). For each passenger extracted, the airports (or other locations) at which the passenger will be authenticated during their trip are identified from the PNR data and the personal data requirements (i.e. the subset of personal data required for authentication) of those airports or locations (or, specifically, of the biometric providers of those locations, or the authorities controlling those locations) are determined. Only the subset of personal data required by the location is thus extracted from the global distribution system or other secure storage facility and kept temporarily in the central database. This subset of data will be used during the authentication step as additional data for confirming the passenger's identification.

Meanwhile, the passenger may actively allow the application to use the data for a trip in the near future as shown in step 7112. If the passenger gives her/his consent to use the data stored, e.g. by clicking on a button for each entered PNR in the application, and the authentication is required in the near future, e.g. the first flight of a trip is the next day (or two days later), the verification process 11 vectorizes the certified selfie with an algorithm provided by operator of the later-used authentication device 2. This enables the method to be used on different authentication devices of different operators, i.e. on different airports and/or from different airlines. After the selfie has been transformed into a vectorized representation, the verification process 11 transfers the vectorized selfie and further data required for the trip from the mobile phone to a central database system 3 in step 7114.

At this stage, prior to the authentication step, there are therefore two pieces of data stored in the central database system 3: the vectorized photo of the passenger and the subset of personal information. These two pieces of data are stored separately and are each stored with the passenger's unique user ID.

On the time and date of the trip, the authentication process 12 takes place. In the first step 7201, a plurality of certified vectorized selfies of the passengers booked and checked-in on this flight is made available to the at least one authentication device 2, i.e. the boarding authentication stations at the at least one airport. Making available should be understood broadly. For example, the data may be transferred to a database located at the airport to which the authentication devices 2 have access, stored in a cache of the memory of each of the authentication devices 2 or made available on a cloud memory, or it may remain on the central database system 3 and a special temporary, secure access given to the authentication device. The plurality of vectorized selfies are selected to include at least the flight for which the authentication device is responsible at that time and may include all passengers passing through that airport that day, or any other selection that limits the risk of false positives while ensuring that the passengers to be authenticated are included. This data transfer from the data stored in the verification process 11 to the authentication process 12 is shown with the dashed lines 7301. A camera of the boarding authentication stations takes a facial picture of the passenger who wants to board the plane in step 7202. Alternatively, the user may take their own photo with their camera or mobile phone and make it available to the app. The facial picture is transformed with the same algorithm to a vectorized presentation that has been used in the verification process 11 in step 7113. The boarding authentication station in this embodiment compares one (vectorized representation of a facial picture) to many (vectorized representations of certified selfies), which is shown in the for-loop 7204 in step 7205.

If no match is found, the authentication process 12 terminates in step 7299. If one match is found, the loop breaks and authenticates the passenger in step 7206. The boarding authentication station may require further data from the passenger, e.g. name, birth date, frequent flyer number or the like, which is then transferred to the authentication device 2 in step 7207. At the end of this boarding process, a door connected to the boarding authentication station opens and allows the passenger to access to the plane, which is shown in step 7208. In step 7209, the authentication process 12 further checks whether the trip or the relevant part of the trip has ended. If so, the authentication process 12 deletes all stored data in the central database system 3 in step 7210.

The following 1$^{st}$ set of clauses is part of the disclosure:

An authentication method of the 1$^{st}$ set of clauses comprising a verification process and an authentication process, wherein the verification process and the authentication process are conducted on at least two distinct systems, wherein at least parts of the verification process are conducted on at least one verification device and at least parts of the authentication process are conducted on at least one authentication device, wherein the verification process comprises: capturing enrollment biometric data of a person; capturing an image of a biometric identification document of the person; in response to the biometric identification document being authentic and valid: extracting corresponding biometric data from the biometric identification document; comparing the enrollment biometric data with the corresponding biometric data from the biometric identification document; and in response to a similarity value of the enrollment biometric data and the corresponding biometric data from the biometric identification document exceeding a similarity threshold: verifying the person; gathering additional data; certificating the enrollment biometric data and the additional data; and storing the certified enrollment biometric data and the certified additional data; and wherein the authentication process, triggered by the requirement of the person to be authenticated, comprises: capturing live biometric data of the person; receiving the stored certified enrollment biometric data of the person; comparing the live biometric data with the certified enrollment biometric data; and in response to a similarity value of the live biometric data and the certified enrollment biometric data exceeding a similarity threshold, authenticating the person.

The authentication method of clause 1 of the 1$^{st}$ set of clauses, wherein at least one of the verification devices is a mobile device of the person, and wherein, in the verification process, storing the certified enrollment biometric data and the certified additional data comprises storing the certified data on the mobile device of the person, and wherein, in the authentication process, receiving the certified enrollment data of the person comprises transferring the certified enrollment biometric data from the mobile device of the person to the authentication device.

The authentication method of clause 1 or 2 of the 1$^{st}$ set of clauses, wherein at least one of the verification devices is a self-service terminal, and wherein the verification process, conducted on the self-service terminal, further comprises: obtaining an identification number, wherein the identification number is a unique identification number extracted from the biometric identification document; in response to the similarity value of the enrollment biometric data and the corresponding biometric data from the biometric identification document exceeding a similarity threshold: generating a key using the additional data; encrypting the certified enrollment biometric data and the certified additional data with the key generated from the additional data; and storing the encrypted certified enrollment biometric and the encrypted certified additional data with the identification number in a central database; and wherein, in the authentication process, receiving the certified enrollment data of the person comprises: capturing an image of an authentication biometric identification document of the person; extracting authentication additional data from the authentication biometric identification document; extracting an authentication identification number from the biometric document, wherein the authentication identification number is a unique identification number extracted from the authentication biometric identification document; generating a key using the authentication additional data; requesting the stored encrypted certified enrollment biometric from the central database using the authentication identification number; and decrypting the encrypted certified enrollment biometric data with the key generated from the authentication additional data.

The authentication method of any one of clauses 1 to 3 of the 1$^{st}$ set of clauses, wherein at least one of the verification devices is a mobile device of the person, and wherein, in the verification process, the certified enrollment biometric data and the certified additional data are stored on the mobile device of the person; and wherein the verification process, in response to the person announcing the need to being authenticated in the near future, further comprises: obtaining an identification number; and storing the certified enrollment biometric data and the certified additional data with the identification number in a central database.

The authentication method of any one of clauses 1 to 4 of the 1$^{st}$ set of clauses, wherein the verification process further comprises: extract data specific to the verification device from the verification device; generating a key using the data extracted from the verification device; encrypting the certified enrollment biometric data and certified additional data with the key generated from the extracted data; and storing the encrypted certified enrollment biometric data and the certified additional data in a central database; in response to the person announcing their need to being authenticated in the near future, requesting a consent to use the stored data comprising the encrypted certified enrollment biometric data and certified additional data; and in response to the consent of the person to use the stored data is noted, decrypting the encrypted certified enrollment biometric data and certified additional data with the key generated from the data extracted from the verification device.

The authentication method of clause 4 or 5 of the 1$^{st}$ set of clauses, wherein the authentication process further comprises: making a plurality of certified enrollment biometric data of people to authenticate available from a central database to an authentication device; and wherein receiving the certified enrollment biometric data of the person comprises comparing the plurality of certified enrollment biometric data with the captured live biometric data of the person and selecting, in response to one of the plurality of certified enrollment biometric data being similar to the live biometric data, the similar certified enrollment biometric data as enrollment biometric data of the person.

The authentication method of any one of clauses 3 to 6, wherein the database is secured by a hardware security module and/or the data stored in the database is encrypted.

The authentication method of any one of clauses 1 to 7 of the 1$^{st}$ set of clauses, wherein the enrollment biometric data, the biometric data from the biometric identification document and the live biometric data comprise biometric facial images, iris scans, fingerprint images, or a combination thereof and/or wherein the additional data comprises data extracted from the biometric document, manually entered data, data retrieved from a third party, or a combination thereof.

The authentication method of any one of clauses 1 to 8 of the 1$^{st}$ set of clauses, wherein the enrollment biometric data, the biometric data from the biometric identification document and the live biometric data comprise a vectorized representation of biometric facial images, iris scans, fingerprint images, or a combination thereof, and wherein the algorithm used for vectorizing the data is predefined by an operator of the authentication device.

The authentication method of any one of clauses 1 to 9 of the 1$^{st}$ set of clauses, wherein capturing the enrollment biometric data and/or capturing the live biometric data comprise taking a photo of at least a part of the person and/or wherein capturing the image of a biometric identification document comprises taking a photo of the biometric identification document, or scanning the biometric identification document.

The authentication method of any one of clauses 1 to 10 of the 1$^{st}$ set of clauses, wherein, in response to the requirement of authentication ends, any data is deleted.

The authentication method of any one of clauses 1 to 11 of the 1$^{st}$ set of clauses, wherein authenticating the person comprises at least one of granting access to an area, transferring the certified additional data to the authentication device, decrypting the certified additional data, or a combination thereof.

The authentication method of any one of clauses 1 to 12 of the 1$^{st}$ set of clauses, wherein the verification process further comprises generating a user account associated with a unique user ID for the person, wherein the user account is secured by a user name and a PIN.

An automatic authentication system of the 1$^{st}$ set of clauses for authenticating people comprising: at least one verification device; and at least one authentication device; wherein the at least one verification device is remote from the at least one authentication device; wherein the at least one verification device and the at least one authentication device are configured to communicate via a network; and wherein the at least one verification device is configured to: capture enrollment biometric data of a person; capture an image of a biometric identification document of the person; in response to the biometric identification document being authentic and valid: extract corresponding biometric data from the biometric identification document; compare the enrollment biometric data with the corresponding biometric data from the biometric identification document; and in response to a similarity value of the enrollment biometric data and the corresponding biometric data from the biometric identification document exceeding a similarity threshold: verify the person; gather additional data; certify the enrollment biometric data and the additional data; and store the certified enrollment biometric data and the certified additional data; and wherein the authentication device is configured to: capture live biometric data of the person; receive the stored certified enrollment biometric data of the person; compare the live biometric data with the certified enrollment biometric data; and in response to a similarity value of the live biometric data and the certified enrollment biometric data exceeding a similarity threshold, authenticate the person.

The automatic authentication system of clause 14 of the 1$^{st}$ set of clauses further comprising a database system, wherein the database system is remote from the at least one verification device and the at least one authentication device; wherein the database system configured to communicate with the verification device and the authentication device via the network; and wherein the database system is configured to: receive data from the at least one verification device; and make data available to the at least one authentication device.

The automatic authentication system of clause 14 or 15 of the 1$^{st}$ set of clauses further configured to execute the features of any one of clauses 2 to 13 of the 1$^{st}$ set of clauses.

A computer program of the 1$^{st}$ set of clauses comprising program code instructions for executing the features of the method according to clauses 1 to 13 of the 1$^{st}$ set of clauses.

The following 2$^{nd}$ set of clauses is part of the disclosure:

An authentication method of the 2$^{nd}$ set of clauses comprising a verification process and an authentication process, wherein the verification process and the authentication process are conducted on at least two distinct systems, wherein at least parts of the verification process are conducted on at least one verification device and at least parts of the authentication process are conducted on at least one authentication device, wherein the verification process comprises: capturing first biometric data of a person; extracting second biometric data from a biometric identification document; comparing the first biometric data with corresponding second biometric data from the biometric identification document to obtain a similarity comparable with a first similarity threshold, wherein the authentication process comprises: capturing live biometric data of the person; receiving the first biometric data of the person; comparing the live biometric data with the first biometric data; and in response to a similarity value of the live biometric data and the first biometric data exceeding a similarity threshold, authenticating the person.

The authentication method of clause 1 of the 2$^{nd}$ set of clauses, wherein the verification process further comprises, in response to the similarity value of the first biometric data compared with the second biometric data exceeding the first similarity threshold, verifying the person's identity; gathering additional data; certifying the first biometric data and the additional data; and storing the certified first biometric data and the certified additional data.

The authentication method of clause 2 of the 2$^{nd}$ set of clauses, wherein the at least one verification device is a mobile device of the person, and wherein, in the verification process, storing the first biometric data and the certified additional data comprises storing the certified data on the mobile device of the person, and wherein, in the authentication process, receiving the certified first data of the person comprises transferring the certified first biometric data from the mobile device of the person to the authentication device.

The authentication method of clause 2 or 3 of the $2^{nd}$ set of clauses, wherein the at least one verification device is a self-service terminal, and wherein the verification process, conducted on the self-service terminal, further comprises: obtaining an identification number, wherein the identification number is a unique identification number extracted from the biometric identification document; in response to the similarity value of the first biometric data and the corresponding second biometric data from the biometric identification document exceeding a similarity threshold: generating a key using the additional data; encrypting the certified first biometric data and the certified additional data with the key generated from the additional data; and storing the encrypted certified enrollment biometric and the encrypted certified additional data with the identification number in a central database; and wherein, in the authentication process, receiving the certified first data of the person comprises: capturing an image of an authentication biometric identification document of the person; extracting authentication additional data from the authentication biometric identification document; extracting an authentication identification number from the biometric document; generating a key using the authentication additional data; requesting the stored encrypted certified first biometric data from the central database using the authentication identification number; and decrypting the encrypted certified first biometric data with the key generated from the authentication additional data.

The authentication method of any one of clauses 2 to 4 of the $2^{nd}$ set of clauses, wherein the at least one verification device is a mobile device of the person, and wherein, in the verification process, the certified first biometric data and the certified additional data are stored on the mobile device of the person, and wherein the verification process, in response to the person announcing their need to being authenticated in the near future, further comprises: obtaining an identification number; and storing the certified first biometric data and the certified additional data with the identification number in a central database.

The authentication method of any one of clauses 2 to 5 of the $2^{nd}$ set of clauses, wherein the verification process further comprises: generating a key using data extracted from the verification device; encrypting the certified first biometric data and certified additional data with the key generated from the extracted data; and storing the encrypted certified first biometric data and the certified additional data in a central database; in response to the person announcing their need to being authenticated in the near future, requesting consent to use the stored data comprising the encrypted certified first biometric data and certified additional data; and in response to the consent of the person to use the stored data being noted, decrypting the encrypted certified first biometric data and certified additional data with the key generated from the data extracted from the verification device.

The authentication method of clause 5 or 6 of the $2^{nd}$ set of clauses, wherein the authentication process further comprises: making a plurality of certified first biometric data items of people to authenticate available from a central database to an authentication device; and wherein receiving the certified first biometric data of the person comprises comparing the plurality of certified first biometric data items with the captured live biometric data of the person and selecting, in response to one of the plurality of certified first biometric data being similar to the live biometric data, the similar certified first biometric data as first biometric data of the person.

The authentication method of any one of clauses 4 to 7 of the $2^{nd}$ set of clauses, wherein the central database is secured by a hardware security module and/or the data stored in the central database is encrypted.

The authentication method of any one of clauses 1 to 8 of the $2^{nd}$ set of clauses, wherein the first biometric data, the second biometric data from the biometric identification document and the live biometric data comprise biometric facial images, iris scans, fingerprint images, or a combination thereof.

The authentication method of any one of clauses 2 to 9 of the $2^{nd}$ set of clauses, wherein the additional data comprises data extracted from the biometric document, manually entered data, data retrieved from a third party, or a combination thereof.

The authentication method of any one of clauses 1 to 10 of the $2^{nd}$ set of clauses, wherein the first biometric data, the second biometric data from the biometric identification document and the live biometric data comprise vectorized representations of biometric facial images, iris scans, fingerprint images, or a combination thereof, and wherein the algorithm used for vectorizing the data is predefined by an operator of the authentication device.

The authentication method of any one of clauses 1 to 11 of the $2^{nd}$ set of clauses, wherein capturing the first biometric data and/or capturing the live biometric data comprise taking a photo of at least a part of the person and/or wherein extracting second biometric data from the biometric identification document comprises capturing the image of a biometric identification document, which comprises taking a photo of the biometric identification document, scanning the biometric identification document or visually inspecting the biometric identification document.

The authentication method of any one of clauses 1 to 12 of the $2^{nd}$ set of clauses, wherein, when a requirement of authentication ends, any received data is deleted.

The authentication method of any one of clauses 1 to 13 of the $2^{nd}$ set of clauses, wherein authenticating the person comprises at least one of granting access to an area, transferring the certified additional data to the authentication device, decrypting the certified additional data, or a combination thereof.

The authentication method of any one of clauses 1 to 14 of the $2^{nd}$ set of clauses, wherein the verification process further comprises generating a user account associated with a unique user ID for the person, wherein the user account is secured by a user name and a PIN.

An automatic authentication system of the $2^{nd}$ set of clauses for authenticating a person comprising: at least one verification device; and at least one authentication device; wherein the at least one verification device is remote from the at least one authentication device; wherein the at least one verification device and the at least one authentication device are configured to communicate via a network; and wherein the at least one verification device is configured to: capture first biometric data of a person; extract second biometric data from the biometric identification document; and compare the first biometric data with corresponding second biometric data from the biometric identification document; and wherein the at least one authentication device is configured to: capture live biometric data of the person; receive the first biometric data of the person; compare the live biometric data with the first biometric data; and in response to a similarity value of the live biometric data and the first biometric data exceeding a similarity threshold, authenticate the person.

The automatic authentication system of clause 14 of the $2^{nd}$ set of clauses further comprising a database system, wherein the database system is remote from the at least one verification device and the at least one authentication device; wherein the database system configured to communicate with the verification device and the authentication device via the network; and wherein the database system is configured to: receive data from the at least one verification device; and make data available to the at least one authentication device.

The automatic authentication system of clause 16 or 17 of the $2^{nd}$ set of clauses further configured to execute the features of any one of clauses 2 to 15 of the $2^{nd}$ set of clauses.

A computer program of the $2^{nd}$ set of clauses comprising program code instructions for executing the features of the method according to clauses 1 to 15 of the $2^{nd}$ set of clauses.

The invention claimed is:

1. A method comprising:
    capturing, at a first self-service kiosk, live biometric data of a person, the live biometric data including a facial image of the person;
    extracting, at the first self-service kiosk, reference biometric data from a biometric identification document, the reference biometric data including a reference facial image;
    comparing the facial image with the reference facial image of the reference biometric data extracted from the biometric identification document to verify an identity of the person;
    in response to verification of the identity of the person, storing enrollment data including (i) the facial image used for comparison with the reference facial image, and (ii) additional data corresponding to the person;
    subsequent to storing the enrollment data, capturing, at a second self-service kiosk, further live biometric data of the person, the further live biometric data including a further facial image of the person;
    in response to capturing the further live biometric data, retrieving the enrollment data;
    comparing the further facial image with the facial image of the enrollment data to authenticate the person; and
    in response to authenticating the person based on the comparison of the further facial image with the facial image of the enrollment data, granting the person access to a restricted area, at the second self-service kiosk.

2. The method of claim 1, further comprising, at the first self-service kiosk: extracting a portion of the additional data, comprising a unique identification number, from the biometric identification document.

3. The method of claim 1, wherein storing the enrollment data includes encrypting the enrollment data with a key generated from at least a portion of the additional data.

4. The method of claim 1, wherein storing the enrollment data includes storing the enrollment data in a central database.

5. The method of claim 4, wherein the authentication process further comprises:
    storing, in the central database a plurality of additional sets of enrollment data corresponding to respective additional persons;
    wherein retrieving the enrollment data includes performing a search of the central database, based on the further live biometric data.

6. The method of claim 1, further comprising:
    when an authentication requirement for the person ends, deleting the enrollment data.

7. A system comprising:
    a first self-service kiosk configured to:
        capture live biometric data of a person, the live biometric data including a facial image of the person;
        extracting, at the first self-service kiosk, reference biometric data from a biometric identification document, the reference biometric data including a reference facial image for comparison with the facial image to verify an identity of the person;
    a central database configured, in response to verification of the identity of the person, to store enrollment data including (i) the facial image used for comparison with the reference facial image, and (ii) additional data corresponding to the person;
    a second self-service kiosk configured, subsequent to storage of the enrollment data, to:
        capture further live biometric data of the person, the further live biometric data including a further facial image of the person, for comparison with the facial image of the enrollment data to authenticate the person; and
        in response to authentication of the person based on the comparison of the further facial image with the facial image of the enrollment data, grant the person access to a restricted area.

8. The system of claim 7, wherein the first self-service kiosk is further configured to: extract a portion of the additional data, comprising a unique identification number, from the biometric identification document.

9. The system of claim 7, wherein the central database is configured to store the enrollment data encrypted with a key generated from at least a portion of the additional data.

10. The system of claim 7, wherein the central database is further configured to store a plurality of additional sets of enrollment data corresponding to respective additional persons, and wherein the central database is searchable based on the further live biometric data.

11. The system of claim 7, wherein the central database is controllable to delete the enrollment data when an authentication requirement for the person ends.

* * * * *